Nov. 25, 1941.                R. S. TAYLOR                2,263,937
                          SPEED CHANGE AXLE
                         Filed July 5, 1939            2 Sheets-Sheet 1

INVENTOR
ROBERT S. TAYLOR
BY Charles S. Evans
HIS ATTORNEY

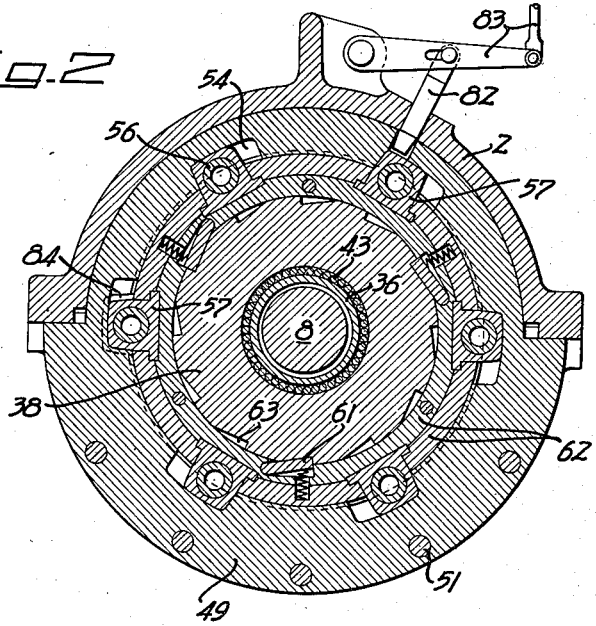
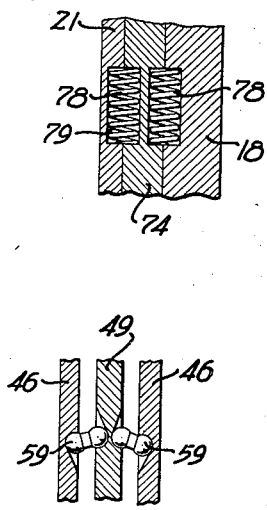
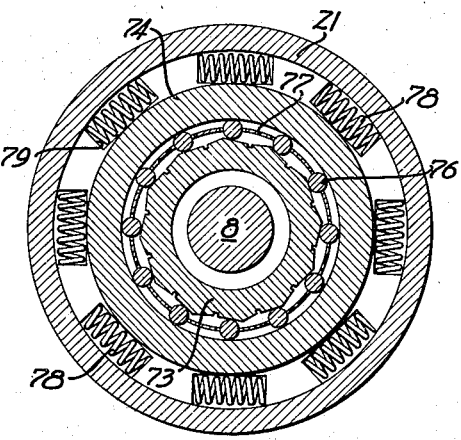
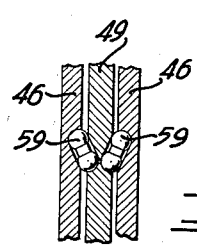

Patented Nov. 25, 1941

2,263,937

UNITED STATES PATENT OFFICE 2,263,937

SPEED CHANGE AXLE

Robert S. Taylor, Seattle, Wash.

Application July 5, 1939, Serial No. 282,879

17 Claims. (Cl. 74—314)

My invention relates to a rear axle for automobiles; and more particularly to an axle embodying speed change gearing.

It is among the objects of my invention to provide an automatic speed change axle.

Another object is to provide a speed change axle having torque controlled means for operating the speed change mechanism.

Another object is to provide an axle embodying an automatic overdrive gearing.

A further object is to provide an axle having a planetary gear system with torque actuated means for controlling operation of the system.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawings:

Figure 2 is a transverse sectional view taken in a plane indicated by line 2—2 of Figure 1, showing the torque brake; and Figure 3 is a similar view showing the one-way clutch, taken in a plane indicated by line 3—3 of Figure 1.

Figure 4 is a detail sectional view showing a pair of the shock absorbing springs, taken in a plane indicated by line 4—4 of Figure 1.

Figures 5 and 6 are fragmentary sectional views showing a torque brake toggle in extended and collapsed positions, taken in a plane indicated by line 5—5 of Figure 1.

Figure 1:
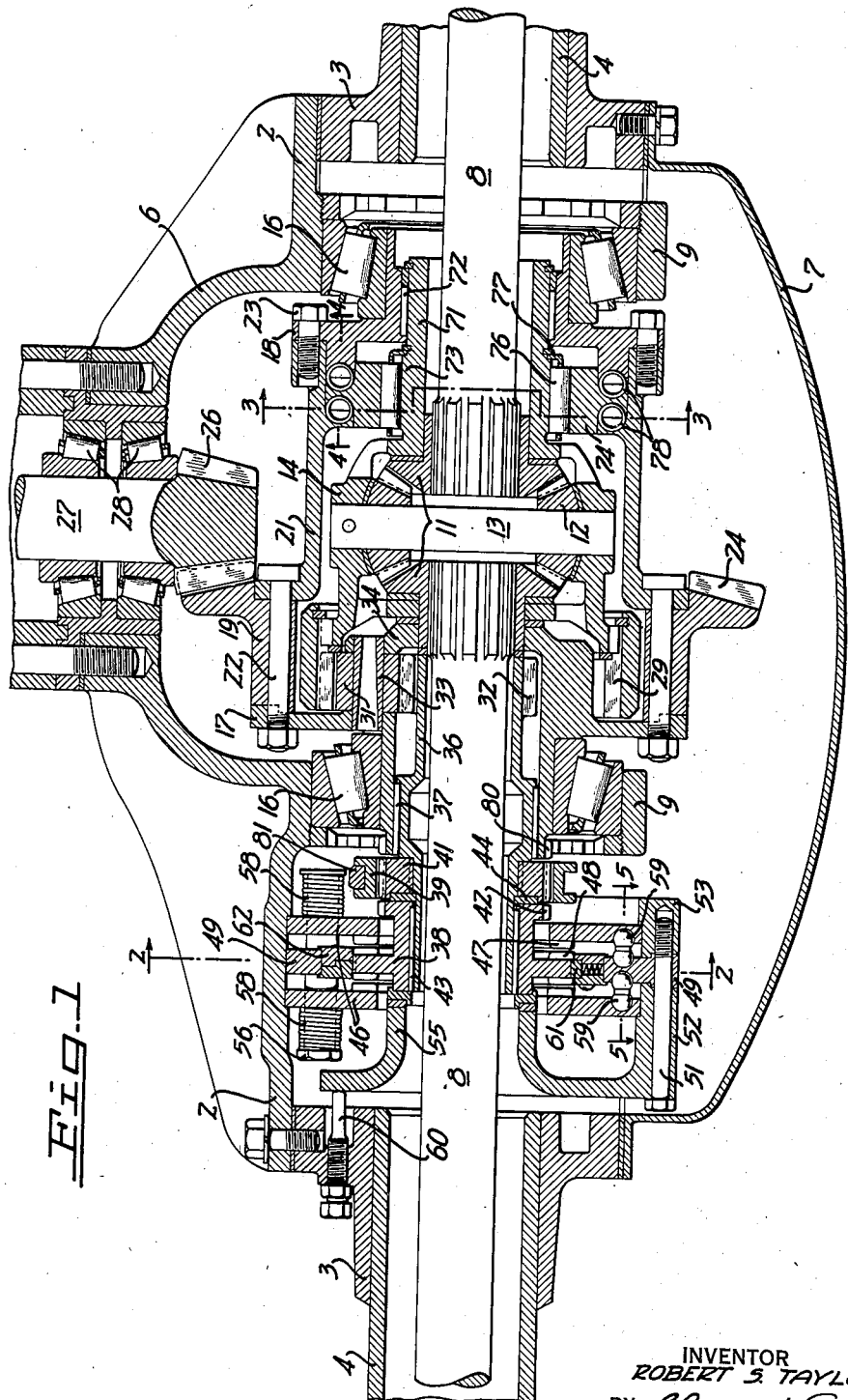
Figure 1 is an axial sectional view of an axle embodying the improvements of my invention.

In terms of broad inclusion the mechanism embodying my invention comprises a differential gearing; a speed change system associated with the gearing; and means for automatically changing the speed ratios in the system. The automatic control unit preferably includes means responsive to relative movement between parts of the mechanism for effecting a predetermined speed ratio in the system, and torque controlled means for effecting another speed ratio. In my preferred construction the speed change system comprises a planetary gearing, and the different speed ratios are produced by either holding one part of the planetary system against rotation or by locking the parts of the system together for rotation as a unit. In this arrangement the automatic control unit preferably comprises a brake engageable upon relative movement between parts of the mechanism to hold the part of the planetary system against rotation, and disengageable under torque to release the held part. A one-way clutch is arranged to lock the parts of the planetary system together upon release of the held part. The speed change mechanism is preferably embodied in an axle, and the planetary system is preferably arranged to provide an overdrive when one of its parts is being held; the torque brake operating to release the held part to cut out the overdrive. The one-way clutch then operates to lock the parts together for direct drive.

In greater detail, and referring to the drawings, my speed change axle comprises a housing section 2 mounted on the inner side of a differential housing 3 connected with axle tubes 4. Housing section 2 has a neck 6, with which the torque tube connects; and the other side of the differential housing is covered by a plate 7 in the usual manner.

Axle shafts 8 extend into housing 3 and project through yokes 9 formed on housing section 2. The shafts are connected by a differential gear system comprising gears 11 mounted on the ends of the coaxial shafts, and differential pinions 12 journaled on a spider shaft 13. The differential gears are enclosed by a casing 14 journaled on the hubs of gears 11 and providing support for the ends of spider shaft 13.

A rotor is also provided in the housing for enclosing the inner gear assembly, and is journaled in main bearings 16 carried by supporting yokes 9. The rotor comprises end bell sections 17 and 18 journaled directly in the bearings, and intermediate sections 19 and 21, all fastened together by suitable studs and bolts 22 and 23. Section 19 of the rotor carries master gear 24 which meshes with driving pinion 26 on drive shaft 27 journaled in bearings 28 in neck 6.

A planetary gear system is also arranged in the housing to provide the speed change gearing, and comprises an orbit gear 29, planet gear 31 and sun gear 32. In the overdrive relationship illustrated, orbit gear 29 is splined directly on differential casing 14, and planet gear 31 is journaled on a shaft 33 mounted on the rotor; the shaft being held at one end by the wall of rotor section 17 and at the other end by an inner spider ring 34 formed as a part of rotor section 17 and journaled on the hub of adjacent differential gear 11. Sun gear 32 surrounds one of the axle shafts 8, and is formed as part of a sleeve 36 also encircling the shaft and journaled in rotor section 17 in a bearing 37. The planet gear mounting is thus driven by master gear 24, and when sun gear 32 is held against rotation pinion 31 planetates about it to drive orbit gear 29 and the connected differential casing 14 faster than the master gear, thus providing an overdrive for the axle.

Means are provided for holding the sun gear against rotation in the overdrive relationship. For this purpose an automatic torque controlled brake is incorporated in the mechanism and is operable to connect the sun gear to the fixed housing. This brake preferably comprises a central element 38 connectable with the sun gear through a manually shiftable member 39 slidably splined on a ring 41 fixed on sun gear sleeve 36. Thus, when member 39 is shifted to the left (Figure 1) to engage with teeth 42 of brake element 38, the latter is connected for rotation with the sun gear. Element 38 of the torque brake is journaled on the sun gear sleeve on a bearing 43, and is spaced from ring 41 by a bearing disc 44.

The torque brake also comprises a pair of brake plates 46 adjacent opposite sides of element 38 and engageable with the latter through annular series of teeth 47 on the plates capable of meshing with complementary teeth 48 on element 38. Plates 46 are mounted on the housing for movement toward and away from each other for engaging and disengaging the central brake element 38, and also have a limited degree of rotational movement to insure smooth meshing of teeth 47 and 48 and to provide means for spreading and collapsing the plates.

Mounting of brake plates 46 is provided by a fixed ring 49 fastened by studs 51 between a clamping ring 52 and an annular portion 53 of housing section 2. Clamping ring 52 also has a neck portion 55 providing an abutment for the outer end of brake element 38; the upper end of the clamping ring being held by a stud 60. Fixed element or ring 49 is notched interiorly at 54 to receive bolts 56 extending through the brake plates. See Figure 2. These notches thus limit rotational movement of the brake plates, and blocks 57 are provided on bolts 56 for slidably engaging the notches. As shown in Figure 1, plates 46 are urged together and into engagement with brake element 38 by compression springs 58 on the ends of bolts 56.

A series of toggle links 59 are pivotally arranged between the brake plates and fixed element 49 to effect inward and outward movement of the plates upon turning of the latter. These toggle links are preferably short, round nosed pieces seated in sockets in adjacent faces of the brake plates and the fixed element. The toggles are collapsed to engage the brake when the sun gear turns clockwise (as viewed from the left in Figure 1); this clockwise rotational movement being transmitted to plates 46 by a series of spring pressed ratchets 61 mounted between the halves of a split cage 62 and engaging ratchet teeth 63 on central brake element 38. Slide blocks 57 of bolts 56 are fixedly mounted on the cage, as shown in Figure 2, so when the cage is turned by ratchets 61 the brake plates 46 are also turned. The ratchets are designed to permit free rotation of element 38 counterclockwise as viewed in Figure 2, and to lock plates 46 with element 38 when the latter tends to rotate clockwise. Upon collapse of toggles 59 the torque brake is engaged to hold the sun gear against rotation, thereby causing planetary operation of the system to provide the overdrive.

Disengagement of the torque brake occurs when the sun gear tends to rotate counterclockwise with sufficient torque to extend the toggles against the action of springs 58; counterclockwise rotation of the sun gear being of course transmitted to plates 46 because the latter at this time are engaged with central brake element 38. Upon extension of toggles 59 the brake plates 46 are forced out of engagement with central element 38, and the sun gear is freed to stop planetary operation of the system.

Means are provided for locking the gears of the planetary system together for rotation as a unit when the sun gear is released, to form a direct driving connection between the master gear and the differential gearing. For this purpose a one-way clutch is preferably interposed between differential casing 14 and rotor section 21. An extension sleeve 71 on the casing is journaled in the rotor in a bearing 72, and the inner ring 73 of the one-way clutch is formed integrally on this sleeve. Outer ring 74 of the clutch is connected to the rotor, and a series of clutch rollers 76 are arranged between the rings and are urged counterclockwise as viewed in Figure 3 by a spring turned cage 77.

This clutch thus locks the master gear for unitary rotation with the differential casing whenever the master gear and connected rotor tend to overrun the differential casing counterclockwise as viewed in Figure 3. When the master gear and differential casing are thus connected together, the planet pinion mounting is also locked to the orbit gear 29, thereby locking the gears of the planetary system together for unitary rotation. It is to be noted that the one-way clutch does not interfere with operation of the planetary system when the sun gear is being held because the differential casing is free to overrun the rotor counterclockwise at any time. While I have shown the one-way clutch interposed between the rotor and differential casing it is understood that the clutch may be mounted between other parts; for example, it could be arranged between the sun gear sleeve and differential casing, and thus be interposed between the sun and orbit gears.

Means are also preferably provided for absorbing shock when the one-way clutch engages to lock the parts together in direct drive. As best shown in Figures 3 and 4, a series of compression springs 78 are placed between outer clutch ring 74 and rotor sections 18 and 21 to provide a resilient connection, so that the shock of clutch engagement is absorbed by the springs. These springs are seated in recesses 79 cut partially in the rotor sections and partially in ring 74, see Figure 4.

Manually operable means is also preferably provided for optionally connecting the sun gear to the planet gear mounting (rotor) to lock the gears together for unitary rotation. Clutch member 39 is utilized for this purpose, and is adapted to engage teeth 80 on the rotor when the clutch member is shifted to the right as viewed in Figure 1. A suitable yoke 81 engaging member 39 is connected with a suitable lever in the driver's compartment. In the neutral position of the clutch member shown in Figure 1 the sun gear is free, and the drive is directly through the one-way clutch; and, since the differential casing may overrun the rotor, the axle also embodies the principle of free-wheeling. When member 39 is shifted to the right to engage teeth 80, the one-way clutch is locked out and a direct drive is provided without free-wheeling.

As shown in Figure 2, manually controlled means is also preferably provided for locking the axle in overdrive. This device comprises a pin 82 slidable in housing 2 and adapted to be inserted behind one of the blocks 57 when the latter are in the position of brake engagement. Pin 82 is actuated by a linkage 83 connected with a lever in the driver's compartment.

Figure 2 also shows shock absorbing means comprising flanges 84 provided on the sides of the lower block 57 to form a closed cup with the adjacent end walls of the notch. This cup catches a certain amount of oil from the surrounding lubricant, and as the block slides toward the limit of its movement the entrapped oil serves to cushion the shock.

Figures 5 and 6 illustrate toggles 59 in extended and collapsed positions. Figure 5 shows that the toggle is carried over center in the extended position, so as to resist too easy collapsing of the toggle. The same effect could be secured by providing tangent springs bearing against the blocks to resist collapsing of the toggles.

Operation: Consider that the optionally shiftable member 39 is engaged with teeth 42 to lock central element 38 of the torque brake with sun gear 32, and also consider that plates 46 of the brake are disengaged. Under these conditions the planetary system is inactive and master gear 24 drives differential casing 14 directly through one-way clutch 76; this direct drive relationship being maintained as long as the master gear and connected rotor tend to overrun the differential casing. At this time the gears of the planetary system are all locked together for rotation as a unit, and sun gear 32 and the connected brake element 38 turn counterclockwise (Figure 2) which they are free to do because ratchets 61 do not prevent it.

However, when the momentum of the car causes the differential casing to overrun the speed at which it is being driven, the orbit gear starts turning faster counterclockwise. This causes the planet gear to start turning counterclockwise about its own axis to put a reverse torque on the sun gear so that the latter starts turning clockwise. This causes element 38 of the torque brake to turn clockwise (Figure 2), and ratchets 61 cause plates 46 to also turn clockwise, thus collapsing toggles 59 to engage the brake plates and lock the sun gear to fixed element 49. With the sun gear held against rotation the pinions 31 planetate about it, causing orbit gear 29 and the connected differential casing to rotate faster than the master gear. One-way clutch rollers 76 do not interfere with such relative rotation since inner ring 74 of the clutch is free to run counterclockwise. The master gear is thus drivably connected to the differential casing through the planetary overdrive system; and the overdrive connection will be maintained as long as the torque brake is engaged.

When the unit is in overdrive the fixed sun gear takes the thrust of the load, and the planet gear puts a counterclockwise torque on the sun gear. This torque is of course transmitted from central brake element 38 to the engaged brake plates 46, tending to turn them counterclockwise and extend the toggles to disengage the brake. Considerable force is necessary to do this, because the angle between the collapsed toggle links is small and a relatively large force is necessary to extend them against springs 58.

The toggles and springs are designed to keep the axle in overdrive until the torque of the sun gear exceeds a predetermined value; the brake releasing torque being calculated to cut out the overdrive before the driving effort of the motor becomes too great. It will be observed that the force required to open the toggles is greatest at the start and decreases rapidly as the toggles spread apart. This insures that any torque sufficient to start the toggles opening is sufficient to complete the brake release motion.

As soon as the torque brake opens to release the sun gear from the holding means, the master gear speeds up and tends to overrun the differential casing. Such overrunning is prevented however by one-way clutch 76, and the parts are locked together for unitary rotation. The direct drive will then be maintained until such time as the differential casing again tends to overrun the master gear to reengage the torque brake, providing of course that manually shiftable member 39 is kept engaged with the torque controlled brake unit. As long as the torque brake is in operation the driver may put the axle in overdrive at any time by releasing the throttle and then pressing in and letting out the regular foot clutch pedal. The effort of the car wheels will then cause sun gear 32 to rotate clockwise to collapse the toggles and engage the torque brake.

Briefly, it will be seen that my speed change axle comprises a differential gearing; a speed change (planetary) system associated with the differential gearing; and a control unit (torque brake) for automatically changing the speed ratios by effecting different combinations of drive and driven elements in the planetary system. When the torque brake engages in response to relative movement between parts of the axle, the sun gear is held to effect the overdrive combination; and when the torque brake releases the sun gear in response to the torque of the latter, the gears of the planetary system are locked together by the one-way clutch to effect the direct drive combination. It is thus seen that the control unit (torque brake) includes means responsive to relative movement between parts of the mechanism for effecting a predetermined speed ratio in the system, and also includes torque means for effecting another speed ratio in the system.

A feature of my invention is that one-way clutch 73—74—76 and one-way brake 38—46—59 cooperate with the planetary gear train to automatically lock driven shaft 8 to fixed element 49 when the driven shaft is rotated reversely. In other words, my speed change axle also functions as a hill holder to prevent the car from rolling backwards. Thus, upon backward turning of driven shaft 8 the one-way clutch locks up the planetary gear system, causing the sun gear to turn backwards and collapse plates 46 of the one-way brake, thereby locking the driven shaft against further backward rotation. Of course, when the regular transmission is put in reverse gear the clutch member 39 of my axle is shifted to disconnect the one-way brake and lock up the planetary system so that the shaft 8 may be driven reversely.

I claim:

1. A speed change mechanism comprising a differential gearing, a planetary gear system associated with said differential gearing, means for holding a part of the planetary system against rotation, means for locking parts of the planetary system together, and torque means for operating one of said means.

2. A speed change mechanism comprising a differential gearing, a planetary gear system associated with said differential gearing, means for holding a part of the planetary system against rotation, means for locking parts of the planetary system together, and torque means for operating said holding means.

3. A speed change mechanism comprising a differential gearing, a planetary gear system associated with said differential gearing, means for holding a part of the planetary system against rotation, means for locking parts of the planetary system together, one of said means including a one-way clutch, and torque means for operating the other means.

4. A speed change mechanism comprising a differential gearing, a planetary gear system associated with said differential gearing, means for holding a part of the planetary system against rotation, means including a one-way clutch for locking parts of the planetary system together, and torque means for operating said holding means.

5. A speed change mechanism comprising a differential gearing, a planetary gear system associated with said differential gearing, means including a one-way clutch for locking parts of the planetary system together, and means including a brake releasable under torque for holding a part of said system against rotation.

6. A speed change axle comprising a master gear, a differential gearing, a planetary gear system associated with the differential gearing and having a part drivably connected with the master gear, means for holding a part of the planetary system against rotation, means for locking a part of the differential gearing for rotation with the master gear, and torque means for operating one of said means.

7. A speed change axle comprising a master gear, a differential gearing, a planetary gear system associated with the differential gearing and having a part drivably connected with the master gear, means for holding a part of the planetary system against rotation, torque means for operating said means, and means including a one-way clutch for locking a part of the differential gearing for rotation with the master gear.

8. A speed change axle comprising a differential gearing, a planetary gear system associated with the differential gearing and having a sun gear, means for holding the sun gear against rotation, and torque means for releasing the sun gear from said holding means.

9. A speed change axle comprising a differential gearing, a speed change system operatively connected with said gearing, means for establishing a driving connection through said system and operable under torque to break said connection, and means for rendering said torque means inactive.

10. A speed change axle comprising a differential gearing, a planetary gear system operatively connected with said gearing, means for holding a part of said system against rotation and operable under torque to release said part, and means for locking the holding means against release.

11. A speed change axle comprising a differential gearing, a planetary gear system operatively connected with said gearing, a fixed element, means for connecting a part of the system to the fixed element, and means for disconnecting said part from the fixed element when the torque of said part exceeds a predetermined value.

12. A speed change axle comprising a differential gearing, a planetary gear system operatively connected with said gearing and having a turnable part, and a brake engageable upon turning of said part in one direction for holding the latter against rotation and disengageable under torque upon turning of said part in the opposite direction to release it.

13. A speed change axle comprising a differential gearing, a planetary gear system operatively connected with said gearing and having a turnable part, and a brake for holding said part against rotation and including a pair of elements having a limited degree of relative turning movement for engaging the brake in response to turning of said part.

14. A speed change axle comprising a differential gearing, a planetary gear system operatively connected with said gearing, a brake associated with said system and including a pair of elements having a limited degree of relative turning movement, means responsive to torque in said system for causing such relative turning movement, and means for engaging and disengaging the brake upon said relative movement.

15. A speed change axle comprising a differential gearing, a planetary gear system operatively connected with said gearing, a brake associated with said system and including a pair of elements having a limited degree of relative turning movement, and a toggle for engaging and disengaging the brake upon said relative movement.

16. A speed change axle comprising a differential gearing, a planetary gear system operatively connected with said gearing, a brake associated with said system and including a pair of elements having a limited degree of relative turning movement, means responsive to torque in said system for causing such relative turning movement, means for engaging and disengaging the brake upon said relative movement, and means for resisting disengagement of the brake.

17. A speed change axle comprising a differential gearing, a planetary gear system operatively connected with said gearing, a one-way clutch associated with said system for locking parts thereof together for rotation as a unit, and means including a brake operable in response to reverse rotation of the differential gearing for holding a part of said system against rotation while said parts are locked together by the one-way clutch.

ROBERT S. TAYLOR.